(12) United States Patent
Matsuo

(10) Patent No.: US 11,720,007 B2
(45) Date of Patent: Aug. 8, 2023

(54) PROJECTION OPTICAL SYSTEM AND PROJECTOR APPARATUS

(71) Applicant: Nittoh Inc., Nagano (JP)

(72) Inventor: Takahiko Matsuo, Nagano (JP)

(73) Assignee: Nittoh Inc., Nagano (JP)

( * ) Notice: Subject to any disclaimer, the term of this patent is extended or adjusted under 35 U.S.C. 154(b) by 372 days.

(21) Appl. No.: 17/257,359

(22) PCT Filed: Jun. 25, 2019

(86) PCT No.: PCT/JP2019/025073
§ 371 (c)(1),
(2) Date: Dec. 31, 2020

(87) PCT Pub. No.: WO2020/008942
PCT Pub. Date: Jan. 9, 2020

(65) Prior Publication Data
US 2021/0124244 A1  Apr. 29, 2021

(30) Foreign Application Priority Data
Jul. 4, 2018  (JP) .................................. 2018-127387

(51) Int. Cl.
*G03B 21/14* (2006.01)
*G02B 13/16* (2006.01)
*G02B 13/18* (2006.01)

(52) U.S. Cl.
CPC ............ *G03B 21/142* (2013.01); *G02B 13/18* (2013.01)

(58) Field of Classification Search
CPC ....... G03B 21/142; G03B 21/14; G02B 13/16
See application file for complete search history.

(56) References Cited

U.S. PATENT DOCUMENTS

| 10,824,059 | B2 | 11/2020 | Minefuji |
| 2017/0332057 | A1 | 11/2017 | Matsuo |
| 2020/0241400 | A1 | 7/2020 | Yoshida et al. |

FOREIGN PATENT DOCUMENTS

| JP | 2004-258620 B2 | 9/2004 |
| JP | 2016-143032 B2 | 8/2016 |
| JP | 2016143032 A | 8/2016 |
| JP | 2019-164184 A | 9/2019 |
| JP | 2019164184 A | 9/2019 |
| WO | 2016/068269 | 5/2016 |

(Continued)

OTHER PUBLICATIONS

Office Action for Japanese Patent Application No. 2020-528807 with English translation.

(Continued)

*Primary Examiner* — Ryan D Howard
(74) *Attorney, Agent, or Firm* — Timothy W. Menasco, Esq.; Harter Secrest & Emery LLP

(57) ABSTRACT

In a projection optical system for projecting an optical image from a first image plane on a reduction side onto a second image plane on a magnification side, the system includes an achromatic lens including a positive lens and a negative lens separately arranged in this order from the reduction side toward the magnification side, and the negative lens having a refractive index of 1.7 or higher and an Abbe's number of 55 or less satisfies the following expression:

$$3.5 \leq |R|/|f| \tag{1},$$

where the radius of curvature of a light incident surface is R and the focal length of an entire projection optical system is f.

16 Claims, 18 Drawing Sheets

EXAMPLE 1

(56) References Cited

FOREIGN PATENT DOCUMENTS

| | | | |
|---|---|---|---|
| WO | 2016068269 | A1 | 5/2016 |
| WO | 2018117209 | A1 | 6/2018 |

OTHER PUBLICATIONS

European Patent Office, European Search Report for PCT Application PCT/JP2019025073, dated Feb. 25, 2022.
International Search Report and Written Opinion for PCT/JP2019/025073, completed Oct. 23, 2019, dated Nov. 5, 2019.

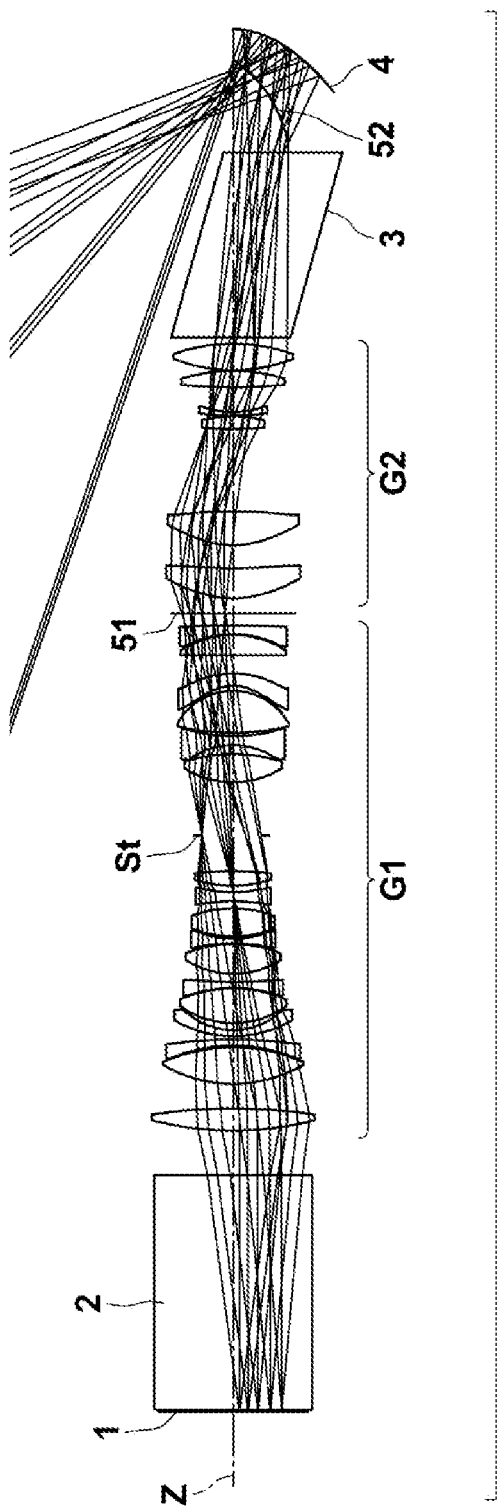

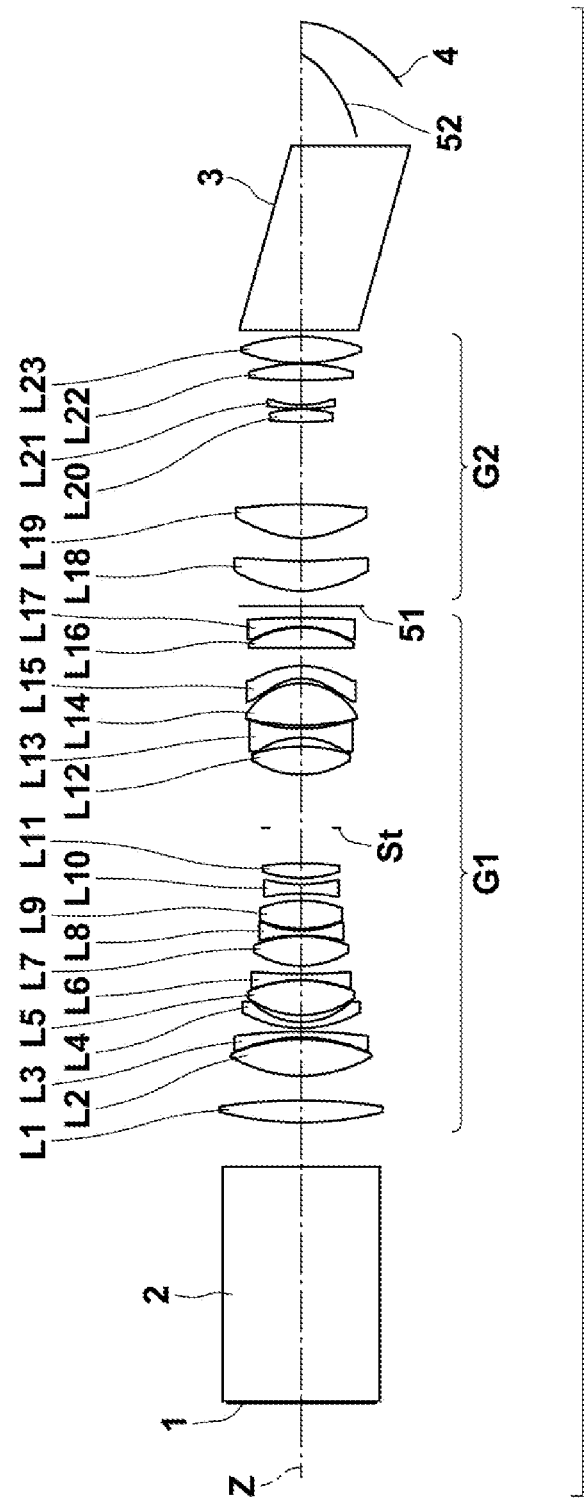

EXAMPLE 1

FIG. 3

| No. | RADIUS OF CURVATURE R | DISTANCE BETWEEN SURFACES D | EFFECTIVE DIAMETER | FOCAL LENGTH f | R / 7.24 | GLASS MATERIAL | REFRACTIVE INDEX n d | ABBE'S NUMBER ν d | REMARKS |
|---|---|---|---|---|---|---|---|---|---|
| 0 | Flat | OBJ | | | | | | | FIRST IMAGE PLANE |
| 1 | Flat | 0.73 | 60.00 | | | | | | |
| 2 | Flat | 95.00 | 60.00 | | | BK7 | 1.51680 | 64.2 | PRISM |
| 3 | Flat | 18.00 | 60.00 | | | | | | |
| 4 | 126.76 | 9.00 | 62.10 | 94.82 | 17.508287 | S-TIH53 | 1.84666 | 23.8 | L1 |
| 5 | -217.59 | 10.00 | 61.70 | | -30.053867 | | | | |
| 6 | 55.88 | 14.80 | 53.50 | 72.69 | 7.718232 | S-FPL53 | 1.43875 | 94.9 | L2 |
| 7 | -68.69 | 0.69 | 51.70 | | -9.487569 | | | | |
| 8 | -63.65 | 2.40 | 50.70 | -104.62 | -8.791436 | TAFD25 | 1.90366 | 31.3 | L3 |
| 9 | -195.26 | 1.44 | 49.70 | | -26.969613 | | | | |
| 10 | 47.11 | 2.40 | 44.30 | -80.78 | 6.506906 | TAFD25 | 1.90366 | 31.3 | L4 |
| 11 | 28.02 | 2.86 | 39.90 | | 3.870166 | | | | |
| 12 | 36.64 | 14.00 | 39.90 | 42.72 | 5.060773 | S-FPM3 | 1.53775 | 74.7 | L5 |
| 13 | -53.79 | 0.25 | 38.30 | | -7.429558 | | | | |
| 14 | -55.38 | 2.40 | 37.50 | -47.62 | -7.649171 | TAFD25 | 1.90366 | 31.3 | L6 |
| 15 | 203.95 | 3.31 | 36.50 | | 28.169890 | | | | |
| 16 | 35.42 | 12.00 | 35.30 | 47.78 | 4.892265 | SILICA | 1.45847 | 67.8 | L7 |
| 17 | -51.76 | 0.25 | 33.30 | | -7.149171 | | | | |
| 18 | -75.15 | 2.00 | 31.60 | -27.46 | -10.379834 | TAFD25 | 1.90366 | 31.3 | L8 |
| 19 | 37.95 | 0.85 | 30.50 | | 5.241713 | | | | |
| 20 | 43.66 | 11.40 | 30.70 | 32.75 | 6.030387 | S-TIH1 | 1.71736 | 29.5 | L9 |
| 21 | -46.08 | 2.93 | 30.50 | | -6.364641 | | | | |
| 22 | -74.19 | 3.60 | 27.90 | -35.74 | -10.247238 | S-LAH55V | 1.83481 | 42.7 | L10 |
| 23 | 51.48 | 2.62 | 27.00 | | 7.110497 | | | | |
| 24 | 47.50 | 5.90 | 28.50 | 48.96 | 6.560773 | S-TIH1 | 1.71736 | 29.5 | L11 |
| 25 | -131.72 | 14.47 | 28.30 | | -18.193370 | | | | |
| 26 | Flat | 21.56 | 25.50 | | | | | | St |
| 27 | 36.54 | 11.40 | 36.40 | 39.44 | 5.046961 | S-NBM51 | 1.61340 | 44.3 | L12 |
| 28 | -64.09 | 3.63 | 35.60 | | -8.852210 | | | | |
| 29 | -30.06 | 3.60 | 35.20 | -24.93 | -4.151934 | S-LAH65V | 1.80400 | 46.6 | L13 |
| 30 | 64.38 | 1.37 | 38.80 | | 8.892265 | | | | |
| 31 | 94.83 | 17.00 | 39.50 | 43.15 | 13.098066 | S-FSL5 | 1.48749 | 70.2 | L14 |
| 32 | -25.55 | 2.06 | 42.00 | | -3.529006 | | | | |
| *33 | -16.85 | 5.00 | 40.40 | -54.44 | -2.327348 | S-BAL42 | 1.58313 | 59.4 | L15 |
| *34 | -39.67 | 7.35 | 41.30 | | -5.479282 | | | | |
| 35 | 3061.66 | 8.30 | 39.20 | 59.74 | 422.881215 | S-TIM1 | 1.62588 | 35.7 | L16 |
| 36 | -38.07 | 0.25 | 39.50 | | -5.258287 | | | | |
| 37 | -40.51 | 3.60 | 39.00 | -53.95 | -5.595304 | S-TIH53 | 1.84666 | 23.8 | L17 |
| 38 | -345.94 | 4.71 | 40.20 | | -47.781768 | | | | |
| 39 | (Image) | 6.17 | 50.00 | | | | | | 51 |
| *40 | 31.27 | 12.10 | 50.70 | 73.54 | 4.319061 | S-BAL42 | 1.58313 | 59.4 | L18 |
| *41 | 97.91 | 9.42 | 50.40 | | 13.523481 | | | | |
| *42 | 36.09 | 13.70 | 49.50 | 60.35 | 4.984807 | S-BSL7 | 1.51633 | 64.1 | L19 |
| *43 | -204.24 | 33.34 | 47.60 | | -28.209945 | | | | |
| 44 | 109.74 | 5.20 | 21.80 | 78.42 | 15.157459 | S-FPL53 | 1.43875 | 94.9 | L20 |
| 45 | -49.58 | 0.25 | 23.20 | | -6.848066 | | | | |
| 46 | 97.94 | 1.50 | 24.70 | -66.26 | 13.527624 | TAFD25 | 1.90366 | 31.3 | L21 |
| 47 | 37.06 | 10.03 | 25.20 | | 5.118785 | | | | |
| 48 | 218.52 | 6.70 | 36.70 | 105.44 | 30.182320 | S-FSL5 | 1.48749 | 70.2 | L22 |
| 49 | -66.83 | 0.25 | 39.00 | | -9.230663 | | | | |
| 50 | 65.23 | 10.70 | 44.50 | 69.55 | 9.009669 | S-FPL51 | 1.49700 | 81.5 | L23 |
| 51 | -69.95 | 2.50 | 45.20 | | -9.661602 | | | | |
| 52 | Flat | 75.00 | 45.20 | | | S-LAM60 | 1.74320 | 49.3 | PRISM |
| 53 | Flat | 49.95 | 44.90 | | | | | | |
| 54 | (Image) | 16.60 | 71.80 | | | | | | 52 |
| *55 | -29.47 | -1170.00 | 70.00 | -14.64 | -4.070440 | | | | MIRROR |
| 56 | Flat | IMG | | | | | | | SECOND IMAGE PLANE |

FIG.4

EXAMPLE 1

| No. | Rdy | K | A3 | A4 | A6 | A8 | A10 | A12 |
|---|---|---|---|---|---|---|---|---|
| 33 | -16.850 | -3.117400 | 0.000000e+000 | -4.549400e-005 | 2.011000e-007 | -4.451800e-010 | 6.192400e-013 | -3.695300e-016 |
| 34 | -39.670 | 0.000000 | 0.000000e+000 | -1.057100e-005 | 1.624000e-008 | 3.952900e-011 | -1.226700e-013 | 1.493800e-016 |
| 40 | 31.270 | 0.077048 | 0.000000e+000 | -4.019400e-005 | 1.256000e-007 | -2.516200e-010 | 2.553900e-013 | -1.109100e-016 |
| 41 | 97.910 | 0.000000 | 0.000000e+000 | -1.108800e-005 | 1.953100e-008 | -3.225200e-011 | 3.634800e-014 | -1.748800e-017 |
| 42 | 36.090 | 0.388100 | 0.000000e+000 | 1.015900e-006 | -4.830800e-008 | 1.132300e-010 | 1.132300e-010 | 6.088500e-017 |
| 43 | -204.240 | 0.000000 | 0.000000e+000 | 2.546800e-006 | -2.012400e-008 | 5.624700e-011 | -7.553200e-014 | 4.394700e-017 |
| 55 | -29.280 | -0.961800 | 3.779500e-005 | 1.208400e-006 | -1.692000e-009 | 1.579700e-012 | -9.182900e-016 | 2.032000e-019 |

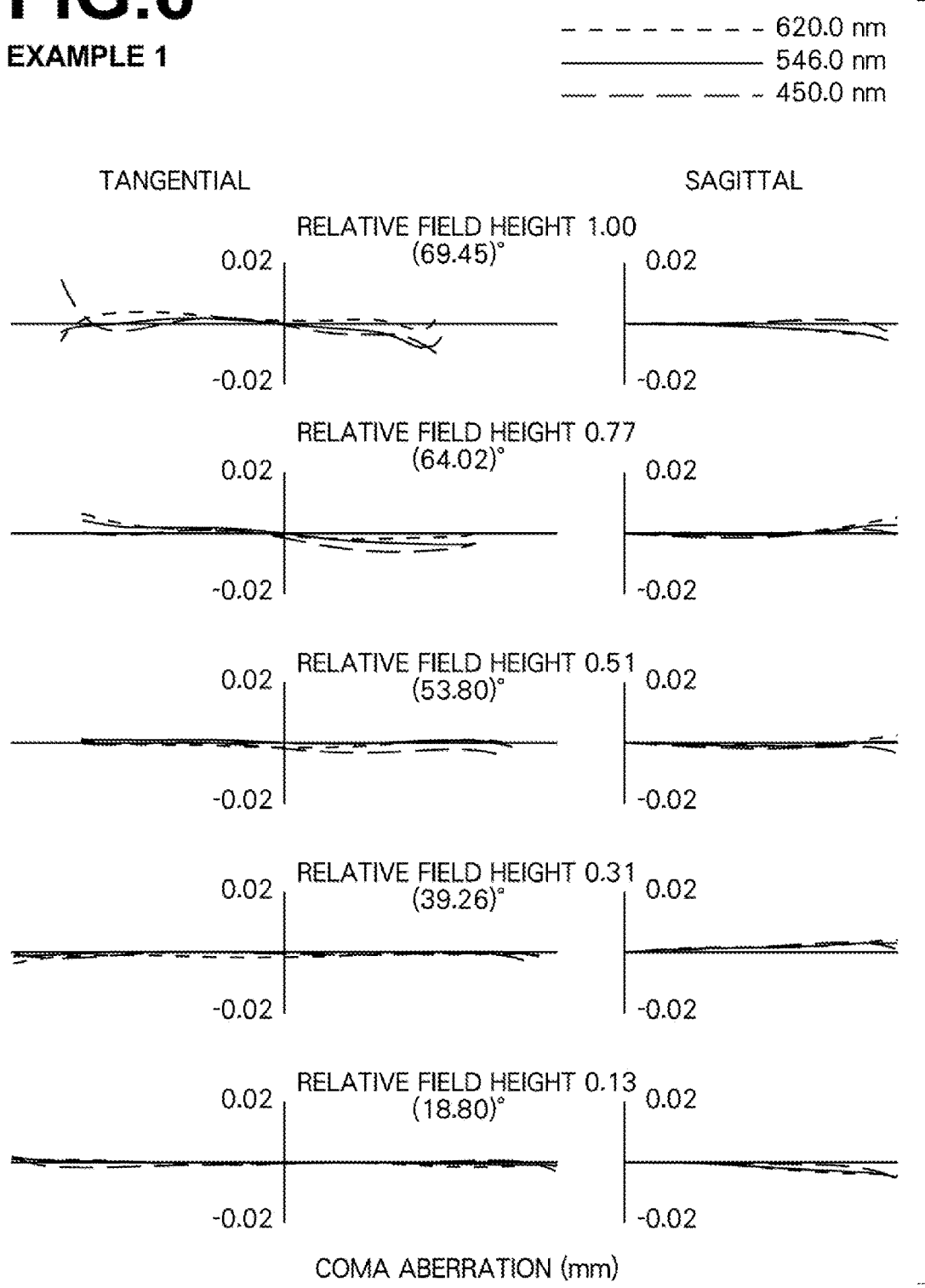

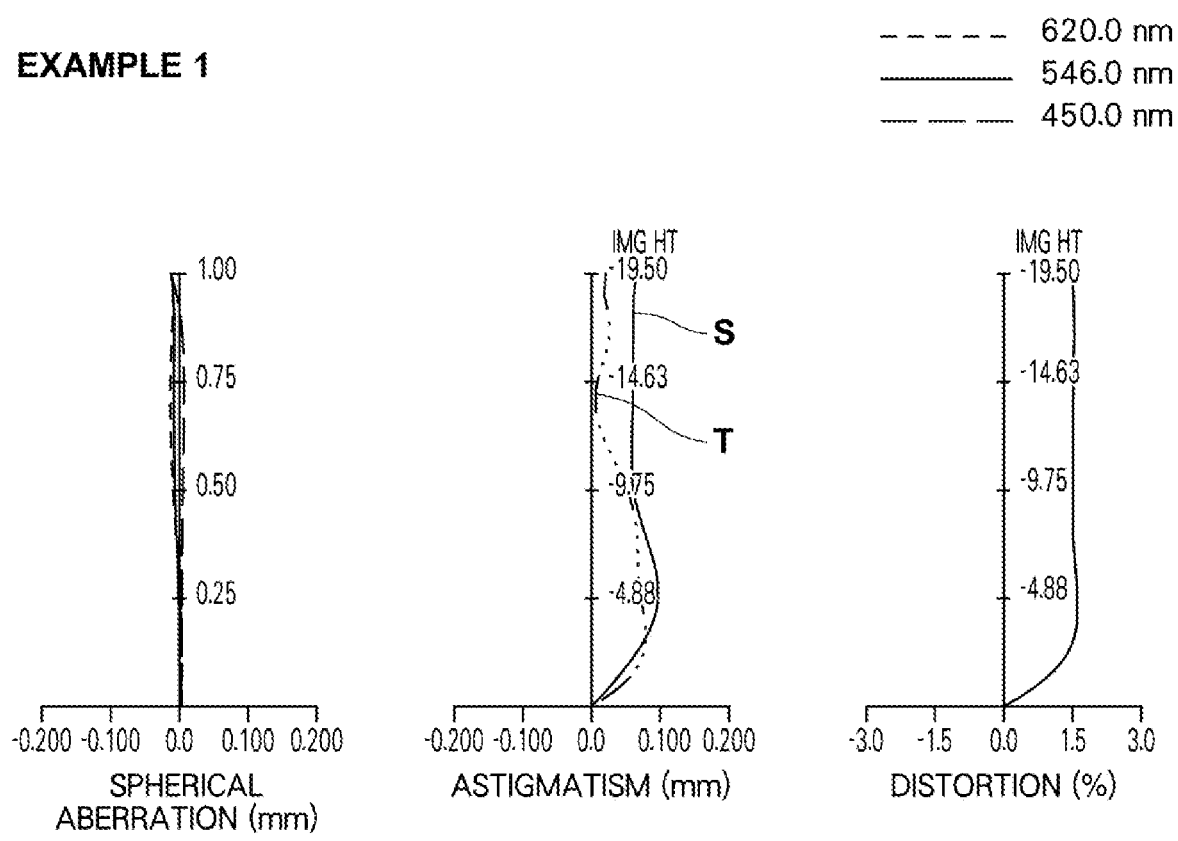

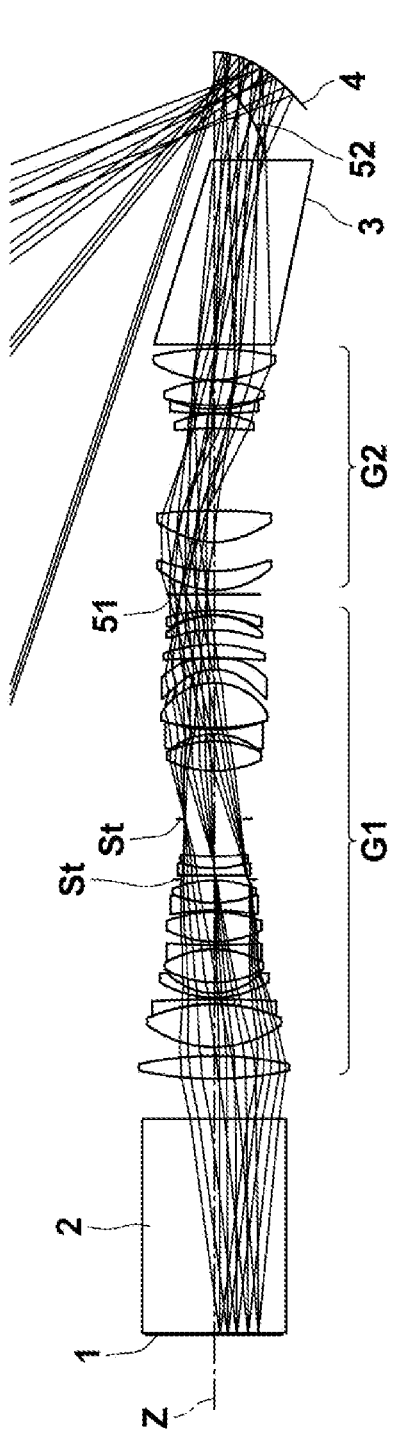

EXAMPLE 2

EXAMPLE 2

FIG.10

| No. | RADIUS OF CURVATURE R | DISTANCE BETWEEN SURFACES D i | EFFECTIVE DIAMETER | FOCAL LENGTH f | R/7.48 | GLASS MATERIAL | REFRACTIVE INDEX n d | ABBE'S NUMBER ν d | REMARKS |
|---|---|---|---|---|---|---|---|---|---|
| 0 | Flat | OBJ | | | | | | | FIRST IMAGE PLANE |
| 1 | Flat | 0.80 | 60.00 | | | | | | |
| 2 | Flat | 95.00 | 60.00 | | | BK7 | | | PRISM |
| 3 | Flat | 18.00 | 60.00 | | | | | | |
| 4 | 153.61 | 10.10 | 63.00 | 91.21 | 20.536096 | FDS90 | 1.84666 | 23.8 | L1 |
| 5 | -153.61 | 4.00 | 62.80 | | -20.536096 | | | | |
| 6 | 49.17 | 19.00 | 55.70 | 70.38 | 6.573529 | S-FPL53 | 1.43875 | 94.9 | L2 |
| 7 | -73.72 | 0.18 | 51.70 | | -9.855615 | | | | |
| 8 | -71.53 | 2.00 | 51.60 | -93.14 | -9.562834 | TAFD25 | 1.90366 | 31.3 | L3 |
| 9 | -463.06 | 0.80 | 49.80 | | -61.906417 | | | | |
| 10 | 45.01 | 2.00 | 44.90 | -85.20 | 6.017380 | TAFD25 | 1.90366 | 31.3 | L4 |
| 11 | 27.88 | 4.84 | 40.60 | | 3.727273 | | | | |
| 12 | 42.97 | 14.45 | 40.70 | 42.32 | 5.744652 | S-FPM3 | 1.53775 | 74.7 | L5 |
| 13 | -42.97 | 0.19 | 39.10 | | -5.744652 | | | | |
| 14 | -41.73 | 1.80 | 39.00 | -39.17 | -5.578877 | TAFD25 | 1.90366 | 31.3 | L6 |
| 15 | 250.60 | 1.64 | 38.70 | | 33.502674 | | | | |
| 16 | 45.56 | 13.10 | 39.00 | 57.03 | 6.090909 | SILICA | 1.45847 | 67.8 | L7 |
| 17 | -56.27 | 0.80 | 37.60 | | -7.522727 | | | | |
| 18 | -97.45 | 3.20 | 35.80 | -33.45 | -13.028075 | TAFD25 | 1.90366 | 31.3 | L8 |
| 19 | 44.99 | 0.18 | 34.20 | | 6.014706 | | | | |
| 20 | 46.91 | 9.90 | 34.20 | 33.94 | 6.271390 | S-TIH1 | 1.71736 | 29.5 | L9 |
| 21 | -46.91 | 0.25 | 33.90 | | -6.271390 | | | | |
| 22 | Flat | 2.00 | 30.80 | | | | | | St |
| 23 | -1481.92 | 3.00 | 29.50 | -51.19 | -198.117647 | SLAH55V | 1.83481 | 42.7 | L10 |
| 24 | 44.30 | 0.10 | 27.60 | | 5.922460 | | | | |
| 25 | 45.83 | 5.30 | 27.60 | 80.88 | 6.127005 | S-TIH1 | 1.71736 | 29.5 | L11 |
| 26 | 201.53 | 16.60 | 27.20 | | 26.942513 | | | | |
| 27 | Flat | 21.45 | 26.20 | | | | | | St |
| 28 | 46.63 | 13.15 | 38.70 | 34.17 | 6.233957 | S-NBH8 | 1.72047 | 34.7 | L12 |
| 29 | -46.63 | 3.13 | 38.20 | | -6.233957 | | | | |
| 30 | -30.68 | 2.00 | 37.20 | -24.89 | -4.101604 | S-LAH55V | 1.83481 | 42.7 | L13 |
| 31 | 67.47 | 0.84 | 40.20 | | 9.020053 | | | | |
| 32 | 87.17 | 20.00 | 40.40 | 43.75 | 11.653743 | S-FPL51 | 1.49700 | 81.5 | L14 |
| 33 | -26.86 | 5.94 | 44.00 | | -3.590909 | | | | |
| *34 | -25.57 | 5.00 | 40.40 | -51.33 | -3.418449 | K-CSK120 | 1.58699 | 59.5 | L15 |
| *35 | -177.24 | 0.30 | 43.40 | | -23.695187 | | | | |
| 36 | -191.49 | 5.85 | 42.00 | 184.55 | -25.600267 | S-FPL51 | 1.49700 | 81.5 | L16 |
| 37 | -62.77 | 6.43 | 41.40 | | -8.391711 | | | | |
| 38 | -55.13 | 6.35 | 38.80 | 154.05 | -7.370321 | S-FPL51 | 1.49700 | 81.5 | L17 |
| 39 | -33.32 | 0.31 | 39.30 | | -4.454545 | | | | |
| 40 | -36.98 | 2.00 | 37.80 | -93.30 | -4.943850 | FDS90 | 1.84666 | 23.8 | L18 |
| 41 | -70.65 | 7.14 | 39.00 | | -9.445187 | | | | |
| 42 | (Image) | 1.86 | 50.00 | | | | | | 51 |
| *43 | 34.49 | 8.55 | 47.30 | 80.68 | 4.610963 | K-CSK120 | 1.58699 | 59.5 | L19 |
| *44 | 114.03 | 12.76 | 46.30 | | 15.244652 | | | | |
| *45 | 34.21 | 14.00 | 47.10 | 61.28 | 4.573529 | K-PBK40 | 1.51760 | 63.5 | L20 |
| *46 | -394.91 | 36.64 | 45.20 | | -52.795455 | | | | |
| 47 | -178.84 | 6.40 | 30.00 | 104.43 | -23.909091 | S-FSL5 | 1.48749 | 70.2 | L21 |
| 48 | -40.20 | 0.25 | 32.50 | | -5.374332 | | | | |
| 49 | 232.45 | 1.80 | 35.20 | -65.88 | 31.076203 | TAFD35 | 1.91082 | 35.2 | L22 |
| 50 | 47.77 | 1.69 | 36.30 | | 6.386364 | | | | |
| 51 | 75.73 | 10.95 | 37.20 | 72.03 | 10.124332 | S-FPL53 | 1.43875 | 94.9 | L23 |
| 52 | -52.07 | 0.25 | 40.90 | | -6.961230 | | | | |
| 53 | 51.36 | 13.75 | 50.10 | 73.52 | 6.866310 | S-FPL51 | 1.49700 | 81.5 | L24 |
| 54 | -116.55 | 2.00 | 50.50 | | -15.581551 | | | | |
| 55 | Flat | 82.00 | 50.10 | | | S-LAH66 | 1.77250 | 49.6 | PRISM |
| 56 | Flat | 48.00 | 60.00 | | | | | | |
| 57 | (Image) | 16.31 | 72.40 | | | | | | 52 |
| *58 | -29.47 | -1170.00 | 70.00 | -14.74 | -3.939840 | | | | MIRROR |
| 59 | Flat | IMG | | | | | | | SECOND IMAGE PLANE |

FIG.11

| EXAMPLE 2 | | | | | | | | |
|---|---|---|---|---|---|---|---|---|
| No. | Rdy | K | A3 | A4 | A6 | A8 | A10 | A12 |
| 34 | -25.570 | -6.401000 | 0.000000e+000 | -8.376000e-005 | 2.516000e-007 | -5.357000e-010 | 7.332000e-013 | -4.165000e-016 |
| 35 | -177.240 | 0.000000 | 0.000000e+000 | -5.528000e-005 | 1.113000e-007 | -1.935000e-010 | 2.246000e-013 | -9.569000e-017 |
| 43 | 34.490 | 0.635000 | 0.000000e+000 | -7.109000e-006 | 4.622000e-008 | -2.158000e-010 | 3.802000e-013 | -2.580000e-016 |
| 44 | 114.030 | 0.000000 | 0.000000e+000 | 4.127000e-005 | -1.734000e-007 | 3.351000e-010 | -2.898000e-013 | 8.134000e-017 |
| 45 | 34.210 | -0.523000 | 0.000000e+000 | 1.142000e-005 | -8.339000e-008 | 2.326000e-010 | -3.316000e-013 | 1.888000e-016 |
| 46 | -394.910 | 0.000000 | 0.000000e+000 | 8.335000e-007 | -1.961000e-008 | 6.322000e-011 | -1.069000e-013 | 7.742000e-017 |
| 58 | -29.470 | -1.101000 | 3.546000e-006 | 1.841000e-006 | -2.220000e-009 | 1.929000e-012 | -1.141000e-015 | 2.667000e-019 |

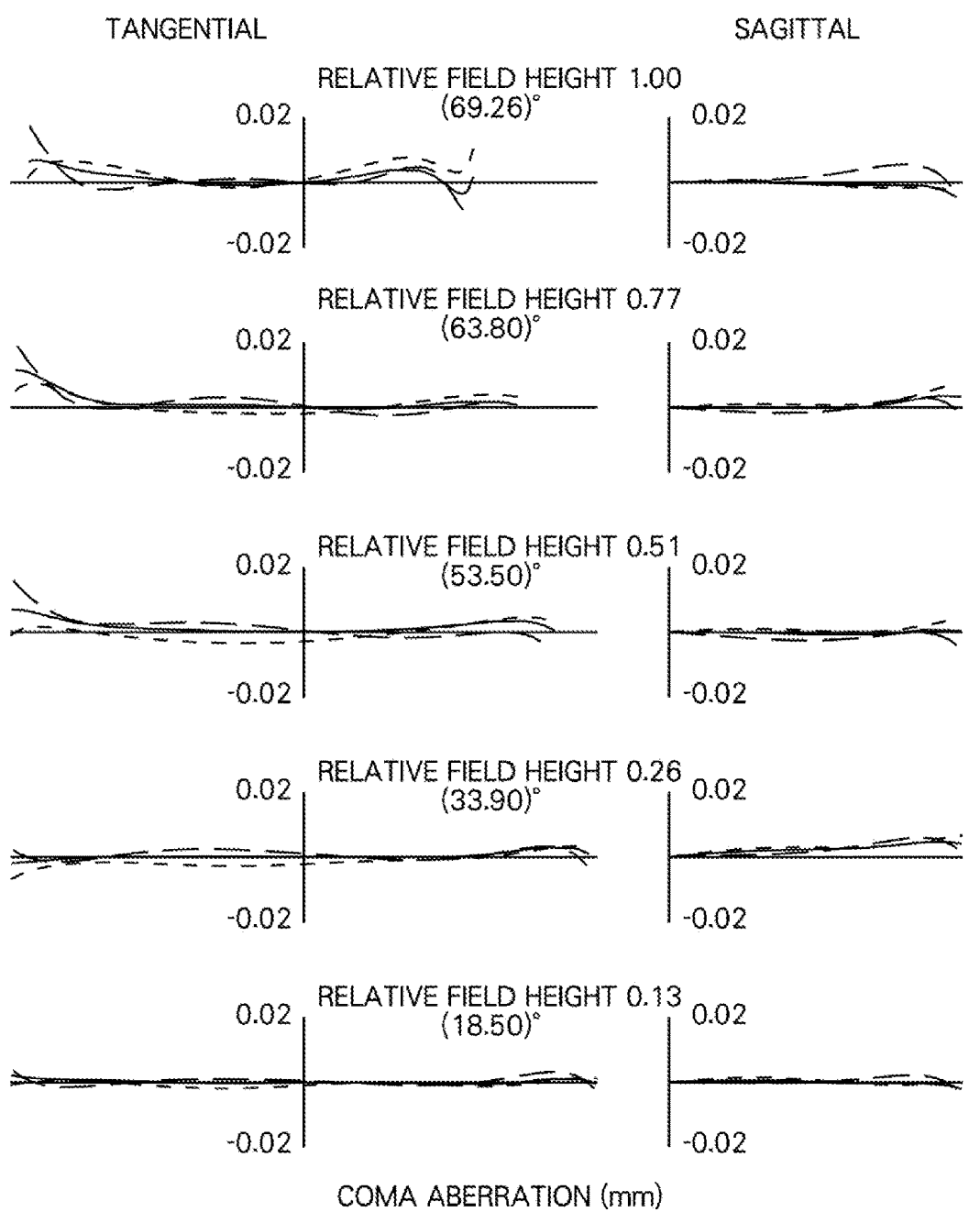

EXAMPLE 2

EXAMPLE 3

EXAMPLE 3

FIG.17

| No. | RADIUS OF CURVATURE R | DISTANCE BETWEEN SURFACES D | EFFECTIVE DIAMETER | FOCAL LENGTH f | R / 7.44 | GLASS MATERIAL | REFRACTIVE INDEX n d | ABBE'S NUMBER ν d | REMARKS |
|---|---|---|---|---|---|---|---|---|---|
| 0 | Flat | OBJ | | | | | | | |
| 1 | Flat | 0.83 | 70.00 | | | | | | FIRST IMAGE PLANE |
| 2 | Flat | 95.00 | 70.00 | | | BK7 | | | PRISM |
| 3 | Flat | 18.00 | 70.00 | | | | | | |
| 4 | 89.56 | 11.37 | 61.80 | 73.23 | 12.037634 | FD60 | 1.80518 | 25.5 | L1 |
| 5 | -167.28 | 3.09 | 61.20 | | -22.483871 | | | | |
| 6 | 88.69 | 13.89 | 54.00 | 86.64 | 11.920699 | S-FPL55 | 1.43875 | 94.7 | L2 |
| 7 | -63.62 | 0.11 | 51.10 | | -8.551075 | | | | |
| 8 | -62.59 | 1.50 | 51.00 | -66.51 | -8.412634 | TAFD35 | 1.91082 | 35.2 | L3 |
| 9 | 2405.13 | 0.80 | 49.40 | | 323.270161 | | | | |
| 10 | 68.89 | 1.50 | 47.30 | -93.11 | 9.259409 | TAFD35 | 1.91082 | 35.2 | L4 |
| 11 | 37.73 | 4.97 | 44.60 | | 5.071237 | | | | |
| 12 | 65.51 | 14.28 | 45.00 | 49.11 | 8.805108 | S-FPM3 | 1.53775 | 74.7 | L5 |
| 13 | -41.09 | 0.31 | 44.40 | | -5.522849 | | | | |
| 14 | -39.69 | 1.40 | 44.40 | -55.77 | -5.334677 | TAFD35 | 1.91082 | 35.2 | L6 |
| 15 | -180.26 | 0.50 | 45.60 | | -24.228495 | | | | |
| 16 | 63.97 | 10.40 | 46.20 | 96.97 | 8.598118 | S-FSL5 | 1.48749 | 70.2 | L7 |
| 17 | -173.71 | 3.91 | 45.40 | | -23.348118 | | | | |
| 18 | -159.66 | 1.60 | 43.80 | -56.74 | -21.459677 | S-LAL18 | 1.72916 | 54.7 | L8 |
| 19 | 56.41 | 0.10 | 43.00 | | 7.581989 | | | | |
| 20 | 57.54 | 14.77 | 43.00 | 51.96 | 7.733871 | JPKH1 | 1.51860 | 69.9 | L9 |
| 21 | -46.52 | 9.00 | 43.00 | | -6.252688 | | | | |
| 22 | Flat | 14.00 | 34.00 | | | | | | St |
| 23 | Flat | 22.00 | 30.30 | | | | | | St |
| 24 | Flat | 17.95 | 30.00 | | | | | | St |
| 25 | 94.29 | 7.85 | 37.80 | 57.24 | 12.673387 | S-NBH53 | 1.73800 | 32.3 | L10 |
| 26 | -74.81 | 0.30 | 38.00 | | -10.055108 | | | | |
| 27 | -148.88 | 1.40 | 37.50 | -57.74 | -20.010753 | TAFD30 | 1.88300 | 40.8 | L11 |
| 28 | 78.58 | 1.67 | 37.20 | | 10.561828 | | | | |
| 29 | 45.90 | 12.04 | 38.50 | 40.45 | 6.169355 | S-FTM16 | 1.59270 | 35.3 | L12 |
| 30 | -45.90 | 3.06 | 38.00 | | -6.169355 | | | | |
| 31 | -29.46 | 1.60 | 37.60 | -31.55 | -3.959677 | TAFD33 | 1.88100 | 40.1 | L13 |
| 32 | 562.68 | 0.10 | 41.00 | | 75.629032 | | | | |
| 33 | 740.56 | 16.85 | 41.00 | 57.94 | 99.537634 | S-FPL55 | 1.43875 | 94.7 | L14 |
| 34 | -26.21 | 4.60 | 43.70 | | -3.522849 | | | | |
| *35 | -25.88 | 5.00 | 41.50 | -51.07 | -3.478495 | K-CSK120 | 1.58699 | 59.5 | L15 |
| *36 | -198.01 | 1.65 | 47.00 | | -26.614247 | | | | |
| 37 | 1799.91 | 8.00 | 43.00 | 124.71 | 241.923387 | S-FPL55 | 1.43875 | 94.7 | L16 |
| 38 | -56.50 | 5.63 | 42.00 | | -7.594086 | | | | |
| 39 | -43.46 | 5.36 | 40.00 | 207.79 | -5.841398 | S-NSL5 | 1.52249 | 59.8 | L17 |
| 40 | -32.39 | 0.51 | 40.00 | | -4.353495 | | | | |
| 41 | -37.25 | 2.53 | 40.00 | -90.56 | -5.006720 | FDS90 | 1.84666 | 23.8 | L18 |
| 42 | -74.03 | 6.41 | 40.00 | | -9.950269 | | | | |
| 43 | (Image) | 1.89 | 50.00 | | | | | | 51 |
| *44 | 35.45 | 8.55 | 48.50 | 82.15 | 4.764785 | K-CSK120 | 1.58699 | 59.5 | L19 |
| *45 | 120.56 | 13.07 | 47.60 | | 16.204301 | | | | |
| *46 | 34.47 | 14.00 | 47.30 | 61.48 | 4.633065 | K-PBK40 | 1.51760 | 63.5 | L20 |
| *47 | -374.70 | 35.74 | 49.10 | | -50.362903 | | | | |
| 48 | 954.39 | 6.29 | 31.10 | 84.12 | 128.278226 | S-FSL5 | 1.48749 | 70.2 | L21 |
| 49 | -42.91 | 0.30 | 32.90 | | -5.767473 | | | | |
| 50 | 640.17 | 1.40 | 34.80 | -55.98 | 86.044355 | TAFD35 | 1.91082 | 35.2 | L22 |
| 51 | 47.47 | 1.63 | 35.90 | | 6.380376 | | | | |
| 52 | 81.17 | 8.92 | 36.20 | 76.48 | 10.909946 | S-FPL55 | 1.43875 | 94.7 | L23 |
| 53 | -55.52 | 2.76 | 39.20 | | -7.462366 | | | | |
| 54 | 58.81 | 12.65 | 50.40 | 65.75 | 7.904570 | S-FPM2 | 1.59522 | 67.7 | L24 |
| 55 | -108.72 | 2.00 | 50.80 | | -14.612903 | | | | |
| 56 | Flat | 82.00 | 60.00 | | | S-LAH66 | 1.77250 | 49.6 | PRISM |
| 57 | Flat | 48.00 | 60.00 | | | | | | |
| 58 | (Image) | 16.38 | 72.90 | | | | | | 52 |
| *59 | -29.47 | -1170.00 | 70.00 | 14.74 | -3.961022 | | | | MIRROR |
| 60 | Flat | IMG | | | | | | | SECOND IMAGE PLANE |

FIG.18

EXAMPLE 3

| No. | Rdv | K | A3 | A4 | A6 | A8 | A10 | A12 |
|---|---|---|---|---|---|---|---|---|
| 35 | -25.880 | -6.459000 | 0.000000e+000 | -8.506000e-005 | 2.609000e-007 | -5.745000e-010 | 8.183000e-013 | -4.892000e-016 |
| 36 | -198.010 | 0.000000 | 0.000000e+000 | -5.716000e-005 | 1.211000e-007 | -2.259000e-010 | 2.796000e-013 | -1.323000e-016 |
| 44 | 35.450 | 0.761000 | 0.000000e+000 | -5.130000e-006 | 4.247000e-008 | -2.142000e-010 | 3.858000e-013 | -2.646000e-016 |
| 45 | 120.560 | 0.000000 | 0.000000e+000 | 4.331000e-005 | -1.811000e-007 | 3.530000e-010 | -3.123000e-013 | 9.425000e-017 |
| 46 | 34.470 | -0.566000 | 0.000000e+000 | 1.126000e-005 | -8.518000e-008 | 2.369000e-010 | -3.405000e-013 | 1.877000e-016 |
| 47 | -374.700 | 0.000000 | 0.000000e+000 | -4.915011e-007 | -1.396729e-008 | 3.946566e-011 | -6.647253e-014 | 4.351662e-017 |
| 59 | -29.470 | -1.101230 | -3.286000e-006 | 2.450000e-006 | -3.166000e-009 | 2.983000e-012 | -1.776000e-015 | 4.233000e-019 |

EXAMPLE 3

| EXAMPLE 3 | |
|---|---|
| ENTIRE SYSTEM | -7.44 |
| FIRST REFRACTIVE SYSTEM | 54.95 |
| SECOND REFRACTIVE SYSTEM | 126.86 |
| SECOND REFRACTIVE SYSTEM + MIRROR | 10.22 |

EXAMPLE 3

EXAMPLE 3

PROJECTION OPTICAL SYSTEM AND PROJECTOR APPARATUS

CROSS-REFERENCE TO RELATED APPLICATIONS

This application is a National Phase Entry of PCT International Application No. PCT/JP2019/025073 filed on Jun. 25, 2019, which claims priority under 35 U.S.C § 119(a) to Japanese Patent Application No. 2018-127387 filed on Jul. 4, 2018. Each of the above applications is hereby expressly incorporated by reference, in its entirety, into the present application.

TECHNICAL FIELD

The present disclosure relates to a projector apparatus and a projection optical system used in the apparatus.

BACKGROUND ART

Conventionally, various projector apparatuses were proposed to try to achieve a larger projection screen and a smaller projection space. For example, Japanese Unexamined Patent Publication No. 2004-258620 (PTL 1) discloses a projection optical system for a projector apparatus including a first optical system composed of refractive optical systems and a second optical system including a reflective surface arranged from a light valve toward a projection screen, i.e., from a reduction side toward a magnification side. In the projection optical system disclosed in Japanese Unexamined Patent Publication No. 2004-258620 (PTL 1), typically, the first optical system is constituted by a first refractive optical system and a second refractive optical system arranged in this order from the reduction side toward the magnification side, and the second optical system is constituted by a concave mirror arranged on the magnification side of the first optical system.

In the projection optical system disclosed in Japanese Unexamined Patent Publication No. 2004-258620 (PTL 1), the first optical system forms an image produced by the light valve, as a middle image, on an optical path of the first and second optical systems, and the second optical system magnifies and reflects the middle image and projects the image onto a screen. Accordingly, a larger projection screen and a smaller space are achievable. Further, the projection optical system configured in this manner can reduce distortion as a whole by compensating distortions by the first and second optical systems with each other.

SUMMARY OF DISCLOSURE

Technical Problem

In the aforementioned projection optical system, since the first optical system includes the refractive optical system, a chromatic aberration may occur, but the chromatic aberration is suppressible by appropriately providing an achromatic lens in the refractive optical system. Here, it is desirable that the achromatic lens can cope with heat generation specific to the projector apparatus. Particularly, recent projector apparatuses generate a large amount of heat, as high output light sources are used to satisfy a request for higher brightness, thereby tending to increase the temperature of projection optical systems. Therefore, it is desirable that the achromatic lens is not a so-called cemented lens, where members cemented together tend to experience discoloration and damage, such as separation, due to chemical change by heat and light, but a lens including a lens having positive refractive power and a lens having negative refractive power separately arranged. Hereinafter, a lens having positive refractive power and a lens having negative refractive power will be simply referred to as a positive lens and a negative lens, respectively.

As stated above, when the heat resistance and light resistance of the projection optical system are taken into consideration, an achromatic lens including a positive lens and a negative lens separately arranged is preferable, but such a kind of achromatic lens tends to cause other problems. Specifically, in such an achromatic lens, since a Fresnel loss (a loss induced by Fresnel reflection) may be generated at a light incident surface of a lens arranged on the magnification side, transmittance tends to drop, compared with a cemented lens.

In view of the foregoing circumstances, the present disclosure tries to provide a projector apparatus that can prevent a drop in transmittance by suppressing a Fresnel loss at an achromatic lens, and a projection optical system for the projector apparatus.

Solution to Problem

A projection optical system of the present disclosure is a projection optical system for projecting an optical image from a first image plane on a reduction side onto a second image plane on a magnification side, and the system includes an achromatic lens including a positive lens and a negative lens separately arranged in this order from the reduction side toward the magnification side, and the curvature of surfaces of the positive lens and the negative lens facing each other has a same polarity, and the negative lens having a refractive index of 1.7 or higher and an Abbe's number of 55 or less satisfies the following expression (1):

$$3.5 \leq |R|/|f| \qquad (1),$$

where the radius of curvature of a light incident surface is R and the focal length of an entire projection optical system is f. Here, the expression "separately arranged" means both of a state where the positive lens and the negative lens are arranged in a completely separate manner and a state where a part of the lenses is in contact with each other but the remaining part is separate, i.e., an abutting state.

In the projection optical system of the present disclosure configured as described above, especially when the refractive index of the negative lens is 1.8 or higher, and the Abbe's number is 40 or less, it is more desirable that the following expression (2) is satisfied:

$$4.5 \leq |R|/|f| \qquad (2).$$

Further, in the projection optical system of the present disclosure configured as described above, especially when the refractive index of the negative lens is 1.85 or higher, and the Abbe's number is 35 or less, it is more desirable that the following expression (3) is satisfied:

$$5.0 \leq |R|/|f| \qquad (3).$$

Further, in the projection optical system of the present disclosure configured as described above, it is desirable that the following expression (4) is satisfied:

$$3.5 \leq |R|/|f| \qquad (4),$$

where the radius of curvature of a light output side surface of the positive lens constituting the achromatic lens together with the negative lens satisfying the expression (1) is R, and the focal length of the entire projection optical system is f.

Further, in the projection optical system of the present disclosure, in which the negative lens satisfies the expression (1), it is more desirable that the refractive index of the positive lens is 1.75 or less.

Further, in the projection optical system of the present disclosure configured as described above, it is desirable that a first meniscus lens having negative refractive power and a second meniscus lens having positive refractive power are arranged immediately on the reduction side of the position of a middle image (first middle image), formed in a refractive optical system by the refractive optical system including the achromatic lens, in this order from the middle image (first middle image) toward the reduction side with a convex surface of each of the meniscus lenses directed toward the middle image (first middle image) side.

Here, the term "immediately" means that no lens is arranged between a position where the middle image is formed and the first and second meniscus lenses. Hereinafter, the meaning of this term is similar.

In the configuration including the first and second meniscus lenses, it is desirable that a third meniscus lens having positive refractive power is arranged immediately on the reduction side of the second meniscus lens.

Further, in the configuration including the first, second and third meniscus lenses, it is desirable that the refractive index and the Abbe's number of the second meniscus lens are substantially the same as those of the third meniscus lens, and the following expression (5) is satisfied:

$$|f1|<|f2|<|f3| \quad (5),$$

where the focal lengths of the first, second and third meniscus lenses are f1, f2 and f3, respectively. Here, the expression "substantially the same" means a difference between the two is ±5%.

Meanwhile, a projector apparatus of the present disclosure is a projector apparatus including a light source, a light modulator for modulating light from this light source and a projection optical system for projecting an optical image formed by the light modulated by the light modulator, and characterized in that the aforementioned projection optical system of the present disclosure is used as the projection optical system.

In the projection optical system of the present disclosure, since the negative lens on the magnification side constituting the achromatic lens satisfies the expression (1), a Fresnel loss at a light incident surface of this negative lens on the magnification side is suppressible. Hence, a drop in transmittance caused by the Fresnel loss is preventable. Further, since this negative lens and a positive lens constituting the achromatic lens are separately arranged, heat resistance and light resistance, which are originally achieved by avoiding a cemented lens as the achromatic lens, are still achievable.

Further, since the projector apparatus of the present disclosure uses the projection optical system, which can achieve the aforementioned advantageous effects, a bright projection image is obtained, and excellent heat resistance and light resistance are also achievable.

BRIEF DESCRIPTION OF DRAWINGS

FIG. 1 A cross section illustrating the lens configuration of a projection optical system in Example 1 together with major light fluxes FIG. 2 A cross section illustrating the lens configuration of the projection optical system in Example 1

FIG. 3 A diagram showing basic data of optical elements constituting the projection optical system in Example 1

FIG. 4 A diagram showing aspheric surface data of optical elements constituting the projection optical system in Example 1

FIG. 5 A diagram showing a focal length of each part in the projection optical system in Example 1

FIG. 6 A diagram showing coma aberrations in the projection optical system in Example 1

FIG. 7 A diagram showing a spherical aberration, an astigmatism and distortion in the projection optical system in Example 1

FIG. 8 A cross section illustrating the lens configuration of a projection optical system in Example 2 together with major light fluxes FIG. 9 A cross section illustrating the lens configuration of the projection optical system in Example 2

FIG. 10 A diagram showing basic data of optical elements constituting the projection optical system in Example 2

FIG. 11 A diagram showing aspheric surface data of optical elements constituting the projection optical system in Example 2

FIG. 12 A diagram showing a focal length of each part in the projection optical system in Example 2

FIG. 13 A diagram showing coma aberrations in the projection optical system in Example 2

FIG. 17 A diagram showing basic data of optical elements constituting the projection optical system in Example 3

FIG. 18 A diagram showing aspheric surface data of optical elements constituting the projection optical system in Example 3

DETAILED DESCRIPTION OF EMBODIMENTS

Figure 9:
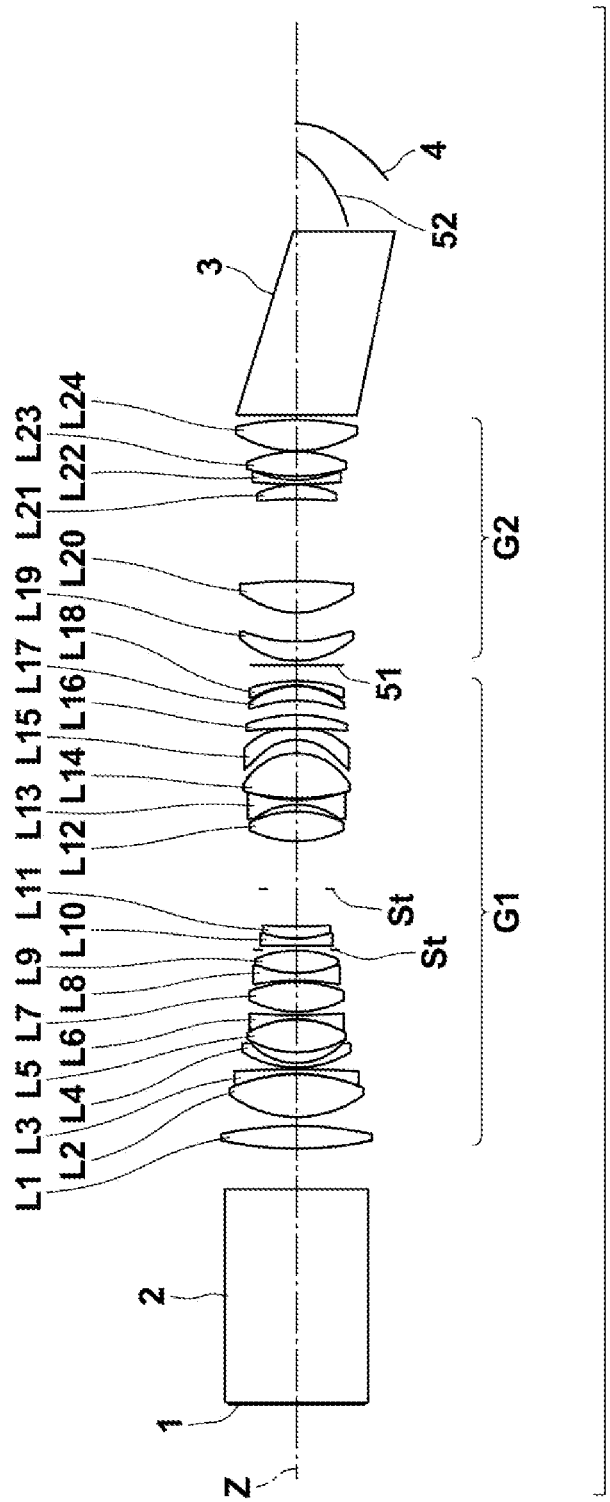

Hereinafter, embodiments of the present disclosure will be described in detail with reference to drawings. FIG. 1 is a cross section illustrating the configuration of a projection optical system according to an embodiment of the present disclosure together with major light fluxes. The configuration example illustrated in FIG. 1 is the same as the configuration of a projection optical system in Example 1, which will be described later. The aforementioned light fluxes are an axial light flux, a light flux at a maximum angle of view and middle light fluxes therebetween. Further, FIG. 2 is a cross section illustrating the configuration of the projection optical system in Example 1 in detail, excluding the light fluxes. In FIG. 1 and FIG. 2, an image display surface 1 side of a light modulator is a reduction side, and last lens L23 side of the lens optical system is a magnification side.

This projection optical system is mounted, for example, in a projector apparatus, and usable to project image information displayed on a light modulator (light valve), such as a DMD, a transmission-type liquid crystal display device or a reflection-type liquid crystal display device, onto a screen. In FIG. 1, a case of mounting the projection optical system in a projector apparatus is assumed, and a prism 2 used in a color combination unit or an illumination light separation unit and an image display surface 1 of a light modulator located on a reduction side surface of the prism 2 are also illustrated. In the projector apparatus, a light flux output from a light source, which is not illustrated, and to which image information has been given at the image display surface 1, enters the illustrated projection optical system through the prism 2, and a middle image is formed by a refractive optical system in this projection optical system. Then, the light flux enters a mirror 4 through a prism 3, and the middle image is reflected by the mirror 4, and magnified and projected onto a screen, which is not illustrated. Here, the prism 3 is also referred to as a glass block, and its action is described, for example, in PCT Japanese Republication No. 2016-68269.

More specifically, as clearly illustrated in FIG. 2, this projection optical system includes first refractive system G1 including a plurality of lenses L1 through L17, arranged along optical axis Z in this order from the reduction side toward the magnification side, and which forms an image displayed on an image display surface 1, as a first middle image 51, and second refractive system G2 including a plurality of lenses L18 through L23 arranged in a similar manner, and which forms a second middle image 52 between the prism 3 and the mirror 4. The first refractive system G1 and the second refractive system G2 constitute a first optical system 10 including refractive optical systems. Further, this projection optical system includes the mirror 4 having positive refractive power, and which reflects and magnifies the second middle image 52. This mirror 4 constitutes a second optical system 20 including a reflective optical system. Here, field stop (flare cutter) St is arranged between lens L11 and lens L12. The illustrated field stop St does not necessarily represent an exact size and shape, but indicates a position on optical axis Z.

As described above, the projection optical system composed of the first optical system 10 including the refractive optical systems and the second optical system 20 including the reflective optical system can increase the size of a projection screen and reduce a projection space. Further, in the projection optical system configured in this manner, distortion of the first optical system 10 and distortion of the second optical system 20 are compensated with each other, and distortion as whole is reducible.

The first optical system 10 includes a plurality of achromatic lenses, as will be described later. Each of the achromatic lenses is composed of a positive lens and a negative lens like many achromatic lenses. Particularly in the present embodiment, a cemented lens is not adopted for the achromatic lens, but an achromatic lens including a positive lens and a negative lens separately arranged is adopted to cope with heat generation in the projector apparatus, as described above. Next, these achromatic lenses will be described in detail.

Here, an achromatic lens including positive lens L2 and negative lens L3, as illustrated in FIG. 1 and FIG. 2, will be described for example. These positive lens L2 and negative lens L3 are separately arranged in this order from the reduction side toward the magnification side. More specifically, the positive lens L2 and the negative lens L3 are spaced from each other, for example, by a very narrow distance. Here, the negative lens L3 has a refractive index of 1.7 or higher and an Abbe's number of 55 or less, as will be described later. Further, radius of curvature R of a light incident surface of this negative lens L3 is −63.65 mm, and focal length f of the entire projection optical system is −7.24 mm (see FIG. 5). Therefore, |R|/|f|=8.80. Note that the sign of radius of curvature R and the sign of focal length f of the entire system will be described later in detail.

Hence, this negative lens L3 satisfies the aforementioned expression (1):

$$3.5 \leq |R|/|f| \qquad (1).$$

Therefore, a Fresnel loss at the light incident surface of this negative lens L3 on the magnification side is suppressible, as described already. Accordingly, it is possible to prevent a drop in transmittance of the projection optical system caused by the Fresnel loss. Further, since this negative lens L3 and positive lens L2 on the reduction side are separately arranged, the heat resistance and the light resistance of the projection optical system are also excellent.

When the expression (1) is satisfied, especially if the refractive index of the negative lens L3 is 1.8 or higher and the Abbe's number of the negative lens L3 is 40 or less, and the aforementioned expression (2) is satisfied:

$$4.5 \leq |R|/|f| \qquad (2),$$

the effect of suppressing the Fresnel loss and preventing a drop in the transmittance of the projection optical system is more remarkable. Since the negative lens L3 also satisfies the expression (2), the aforementioned effect is more remarkably achievable.

Further, when the expression (1) is satisfied, especially if the refractive index of the negative lens L3 is 1.85 or higher and the Abbe's number of the negative lens L3 is 35 or less, and the aforementioned expression (3) is satisfied:

$$5.0 \leq |R|/|f| \qquad (3),$$

the effect of suppressing the Fresnel loss and preventing a drop in the transmittance of the projection optical system is more remarkable. Since the negative lens L3 also satisfies the expression (3), the aforementioned effect is more remarkably achievable.

Hence, in a projector apparatus including a light source, a light modulator for modulating light from this light source and a projection optical system for projecting an optical image formed by the light modulated by this light modulator, when the projection optical system of the present embodiment is used, a bright projection image is obtainable, and the projector apparatus can also achieve excellent heat resistance and light resistance.

Figure 15:
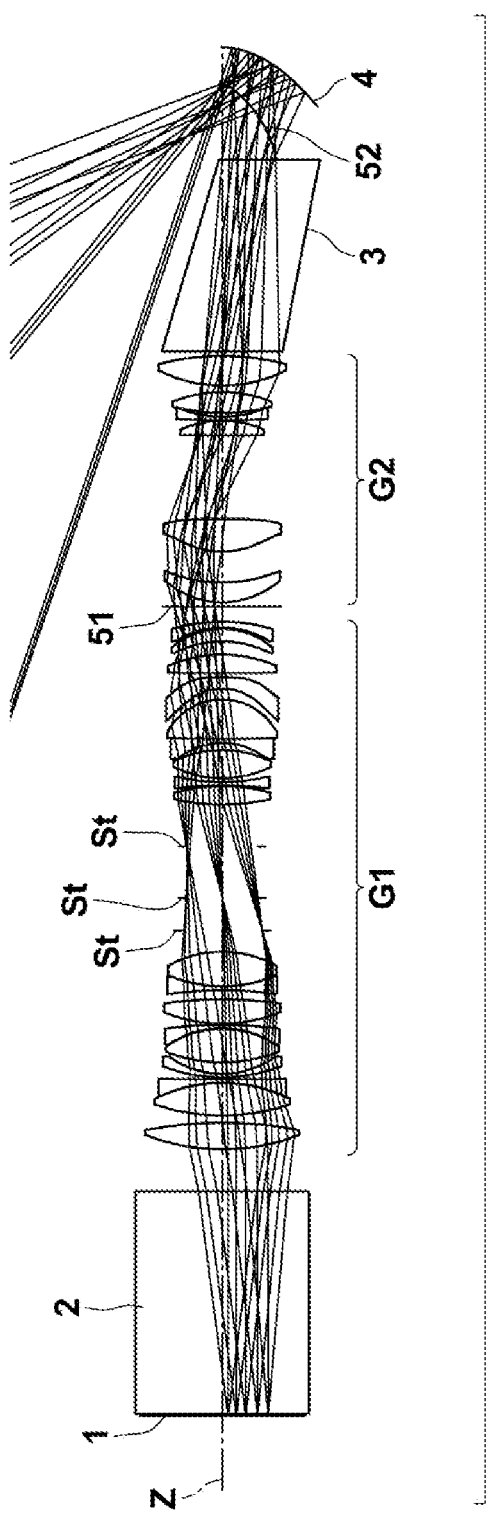
FIG. 15 A cross section illustrating the lens configuration of a projection optical system in Example 3 together with major light fluxes FIG. 16 A cross section illustrating the lens configuration of the projection optical system in Example 3
Figure 16:
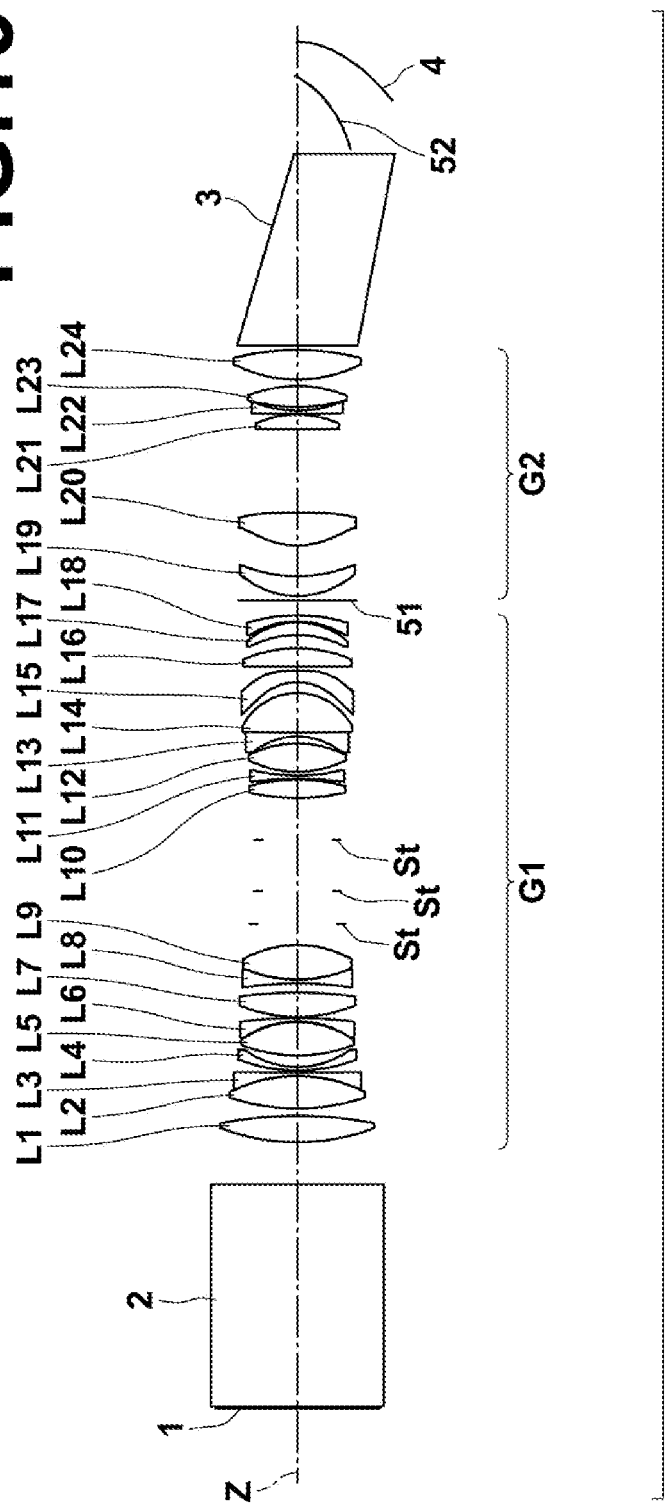

Next, examples of the projection optical system of the present disclosure will be described. First, a projection optical system in Example 1 will be described. The configuration of the projection optical system in Example 1 is shown in the cross sections illustrated in FIG. 1 and FIG. 2, as described already. In FIG. 1 and FIG. 2 and FIG. 8 and FIG. 9, illustrating Example 2, and FIG. 15 and FIG. 16, illustrating Example 3, and which correspond to FIG. 1 and FIG. 2, the image display surface 1 side of the light modulator is the reduction side, and the last lens L23 (Example 1) side or the last lens L24 (Examples 2 and 3) side of the second refractive system G2 is the magnification side.

The projection optical system in Example 1 includes the first optical system 10 composed of the first refractive system G1 and the second refractive system G2 and the second optical system 20 including the reflective optical system arranged in this order from the reduction side. In Example 1, the first refractive system G1 includes, for example, 17 lenses of L1 through L17, and the second refractive system G2 includes, for example, 6 lenses of L18 through L23.

Regarding the projection optical system in Example 1, FIG. 3 shows basic data of composition elements, and FIG. 4 shows data about aspheric surface coefficients, and FIG. 5 shows the focal length of each part. Next, the meaning of signs in the drawings will be described by using Example 1, as an example, but the meaning is basically similar in Examples 2 and 3.

In the basic data shown in FIG. 3, the column of surface number No. shows surface numbers sequentially increasing toward the magnification side from a surface of a composition element furthest to the reduction side, as the first surface. The column of radius of curvature R shows the radius of curvature of each surface. The sign of the radius of curvature R is positive when the shape of a surface is convex toward the reduction side, and negative when the shape of a surface is convex toward the magnification side. The column of surface distance Di shows a distance on optical axis Z between a surface with a surface number of i and a surface with a surface number of i+1. The focal length f is positive when a surface has positive refractive power, and negative when a surface has negative refractive power. The radius of curvature R, surface distance Di and focal length f, as described above, and an effective diameter are represented by the unit of mm. The column of "R/7.24" shows a value obtained by dividing the radius of curvature R by the focal length of the entire projection optical system (see FIG. 5). The focal length shown in FIG. 5 is a value with a positive or negative sign, as will be described later, but an absolute value without regard to its sign is shown. Further, the column of nd shows the refractive index of each optical element for d-ray (wavelength of 587.6 nm), and the column of vd shows the Abbe's number of each optical element for d-ray. FIG. 3 includes the first image plane, which is the image display surface 1 of the light modulator, the prism 2, the middle image to be formed, the prism 3, the mirror 4 and a second image plane located on a projection screen. The first image plane and the second image plane are represented by "OBJ" and "IMG", respectively, in the column of surface distance Di. The middle image is represented by "(Image)" in the column of surface number No., and the numbers "51" and "52", indicated in FIG. 2, are written in the column of remarks. An aspheric surface is indicated by the symbol of * attached to a number in the column of surface numbers No., and the radius of curvature of an aspheric surface is represented by the numerical value of a paraxial radius of curvature.

The data about the aspheric surface coefficients in FIG. 4 show the surface number of an aspheric surface and aspheric surface coefficients about the aspheric surface. The shape of the aspheric surface is represented by using coefficients K, A3, A4, A6, A8, A10 and A12, shown in FIG. 4, by the following expression:

$$X=(1/R)Y^2/[1+\{1-(1+K)(1/R)^2Y^2\}^{1/2}]+A3Y^3+A4Y^4+A6Y^6+A8Y^8+A10Y^{10}+A12Y^{12},$$

where X is a coordinate in the direction of the optical axis, Y is a coordinate in a direction perpendicular to the optical axis, a light travelling direction is positive, and R is a paraxial radius of curvature. In the data, "en" means "the n-th power of 10".

FIG. 5 shows the focal length of the first refractive system G1, the focal length of the second refractive system G2 and the focal length of a combined system of the second refractive system G2 and the mirror 4. These focal lengths are indicated by a positive value when the refractive power is positive, and by a negative value when the refractive power is negative, and the unit of the focal length is mm.

Note that the numerical value data in FIG. 3 through FIG. 5 are appropriately rounded to predetermined digits.

In the basic data shown in FIG. 3, negative lenses similar to the aforementioned negative lens L3, which constitutes an achromatic lens together with a positive lens arranged on its reduction side and satisfies the expression (1), are all clearly indicated. In this Example 1, the negative lens L3 satisfies all of the expressions (1) through (3), as described already. Further, the negative lenses L6, L8, L10, L13 and L17 also satisfy the expression (1), and particularly, the negative lenses L6 and L8 satisfy also the expressions (2) and (3), and the negative lens L17 satisfies also the expression (2).

Regarding the aforementioned achromatic lenses including the negative lenses satisfying the expressions (1) through (3), the output angle of light output from a positive lens constituting the achromatic lens together with the negative lens satisfying the expression (1) is reducible by satisfying the following expression (4):

$$3.5 \le |R|/|f| \tag{4},$$

where R is the radius of curvature of an output side of the positive lens and f is the focal length of the entire projection optical system. Accordingly, the Fresnel reflection of light incident on the negative lens is suppressible. In this case, when the refractive index of the positive lens is 1.75 or less, the output angle of light output from the positive lens is further reducible.

Further, the output angle of light output from a positive lens constituting the achromatic lens together with the negative lens satisfying the expression (2) is further reducible by satisfying the following expression (6):

$$4.0 \le |R|/|f| \tag{6},$$

where R is the radius of curvature of an output side of the positive lens and f is the focal length of the entire projection optical system. Accordingly, the Fresnel reflection of light incident on the negative lens is suppressible. In this case, when the refractive index of the positive lens is 1.70 or less, the output angle of light output from the positive lens is further reducible.

Further, the output angle of light output from a positive lens constituting the achromatic lens together with the negative lens satisfying the expression (3) is further reducible by satisfying the following expression (7):

$$5.0 \le R|/|f| \tag{7},$$

where R is the radius of curvature of an output side of the positive lens and f is the focal length of the entire projection optical system. Accordingly, the Fresnel reflection of light incident on the negative lens is suppressible. In this case, when the refractive index of the positive lens is 1.60 or less, the output angle of light output from the positive lens is further reducible.

In Example 1, the negative lenses L3, L6, L8, L10, L13 and L17 satisfy the expression (1), and the positive lenses L2, L5, L7, L9, L12 and L16 satisfy the expression (4). The refractive indices of the positive lenses L2, L5, L7, L9, L12 and L16 are 1.75 or less.

Further, the negative lenses L3, L6, L8 and L17 satisfy the expression (2), and the positive lenses L2, L5, L7 and L16 satisfy the expression (6). The refractive indices of the lenses L2, L5, L7 and L16 are 1.70 or less.

Further, the negative lenses L3, L6 and L8 satisfy the expression (3), and the positive lenses L2, L5 and L7 satisfy the expression (7). The refractive indices of the positive lenses L2, L5 and L7 are 1.60 or less.

Since the signs, meaning and description method of each data described about Example 1 are similar in the following examples unless otherwise specified, redundant descriptions will be omitted.

Next, with reference to FIG. 6 and FIG. 7, aberrations in the projection optical system in Example 1 will be described. FIG. 6 illustrates lateral aberration diagrams at five different image heights. As shown in the diagrams, coma aberrations are excellently corrected, and a sharp image is projectable onto a screen. Here, the coma aberrations for the wavelength of 620.0 nm, the wavelength of 546.0 nm and the wavelength of 450.0 nm are indicated by a broken line, a solid line and a dashed line, respectively, and aberrations for tangential rays (T) and sagittal rays (S) are shown for each wavelength.

FIG. 7 shows each aberration diagram for the projection optical system in Example 1. Each aberration diagram shows a spherical aberration, astigmatism, a distortion aberration (distortion) in this order from the left side of the drawing. In the spherical aberration diagram, aberrations for the wavelength of 620.0 nm, the wavelength of 546.0 nm and the wavelength of 450.0 nm are indicated by a broken line, a solid line and a dashed line, respectively. In the astigmatism diagram, an aberration in the sagittal direction and an aberration in the tangential direction for the wavelength of 546.0 nm are indicated by a solid line and a dot dashed line, respectively, and denoted by (S) and (T), respectively. In the distortion diagram, an aberration for the wavelength of 546.0 nm is indicated by a solid line. As shown in the diagrams, the spherical aberration, astigmatism and distortion are also excellently corrected.

Next, a projection optical system in Example 2 will be described. As illustrated in the cross sections of FIG. 8 and FIG. 9, the projection optical system in Example 2 includes a first optical system 10 including first refractive system G1 and second refractive system G2 and a second optical system 20 including a reflective optical system arranged in this order from the reduction side. The first refractive system G1 includes, for example, 18 lenses of L1 through L18, and the second refractive system G2 includes, for example, 6 lenses of L19 through L24. In this Example 2, a first middle image 51 is formed in the first refractive system G1, and a second middle image 52 is formed between the prism 3 and the mirror 4. The second middle image 52 is reflected and magnified by the second optical system 20 including the mirror 4, and projected. Here, field stops (flare cutters) St are arranged between lens L9 and lens L10 and between lens L11 and lens L12, respectively. The illustrated field stop St does not necessarily represent an exact size and shape, but represents a position on optical axis Z.

Regarding the projection optical system in Example 2, FIG. 10 shows basic data of composition elements, and FIG. 11 shows data about aspheric surface coefficients, and FIG. 12 shows the focal length of each part.

In the basic data shown in FIG. 10, the column of "R/7.48" shows a value obtained by dividing the radius of curvature R by the focal length of the entire projection optical system (see FIG. 12). This focal length is represented by an absolute value in a similar manner to FIG. 3.

In the basic data shown in FIG. 10, negative lenses satisfying the expression (1) are also all clearly indicated. In this Example 2, negative lenses L3, L6, L8, L13 and L18 satisfy the expression (1), and particularly, the negative lenses L3, L6 and L8 satisfy also expressions (2) and (3), and the negative lens L18 satisfies also the expression (2).

In Example 2, the negative lenses L3, L6, L8, L13 and L18 satisfy the expression (1), and the positive lenses L2, L5, L7, L12 and L17 satisfy the expression (4). The refractive indices of the positive lenses L2, L5, L7, L12 and L17 are 1.75 or less.

The negative lenses L3, L6, L8 and L18 satisfy the expression (2), and the positive lenses L2, L5, L7 and L17 satisfy the expression (6). The refractive indices of the lenses L2, L5, L7 and L17 are 1.70 or less.

The negative lenses L3, L6 and L8 satisfy the expression (3), and the positive lenses L2, L5 and L7 satisfy the expression (7). The refractive indices of the positive lenses L2, L5 and L7 are 1.60 or less.

Further, in Example 2, a first meniscus lens (negative lens L18) having negative refractive power and a second meniscus lens (positive lens L17) having positive refractive power are arranged immediately on the reduction side of a position where the first middle image 51 is formed in the first optical system 10 by the first optical system 10, which is a refractive optical system, in this order from the first middle image 51 toward the reduction side with a convex surface of each of the meniscus lenses directed toward the first middle image 51 side.

The incident angle of rays entering a concave surface of the negative first meniscus lens L18 is reducible by arranging the positive second meniscus lens L17 on the reduction side of the negative first meniscus lens L18, as described above. Therefore, the reflection of light at this concave surface is reduced, and a Fresnel loss is reducible. Further, it is possible to generate a transverse chromatic aberration in the first refractive system G1 having an opposite phase to that of a transverse chromatic aberration generated in the second refractive system G2 without increasing geometrical aberrations, such as a spherical aberration, a coma aberration and a field curvature, by arranging the lenses in combination having substantially concentric shapes of the same sphere immediately before the first middle image 51. It is desirable that the substantially concentric shapes have, for example, a difference in radii of curvature of 20% or less. Further, the coma aberration of an upper ray of off-axial light is effectively correctable by setting the radii of curvature of both of the negative first meniscus lens L18 and the positive second meniscus lens L17 in such a manner that the lenses L18 and L17 are apart from each other in a peripheral area more than in a vicinity of the optical axis.

Further, in this example 2, a third meniscus lens (positive lens L16) having positive refractive power is arranged immediately on the reduction side of the positive second meniscus lens L17. It is possible to give telecentric characteristics (with the direction of a flux of rays inclining toward the reduction side) by arranging the third meniscus lens L16 having positive power immediately before the positive second meniscus lens L17 in this manner. Accordingly, it is possible to further reduce the diameter of negative meniscus lens L15 including an aspheric surface, which is difficult to produce, and its production becomes easy.

Further, in this Example 2, when focal lengths of the first meniscus lens L18, the second meniscus lens L17 and the third meniscus lens L16 are f1, f2 and f3, respectively, the values of f1, f2 and f3 are −93.30 mm, 154.05 mm and 184.55 mm, respectively, and satisfy the aforementioned expression (5):

$$|f1|<|f2|<|f3| \qquad (5).$$

Further, the second meniscus lens L17 and the third meniscus lens L16 are formed from the same glass material, and have the same refractive index and Abbe's number.

From the view point of a transverse chromatic aberration, it is desirable that the outer surfaces of the first meniscus lens L18 and the second meniscus lens L17 in combination have concentric shapes of the same sphere. Further, a combined focal length of these two meniscus lenses L18, L17 is −212.7 mm, and when the value is such a negative value, the refractive power of the third meniscus lens L16 can be increased. Hence, it is possible to further reduce the diameter of the aspheric negative meniscus lens L15, which is difficult to produce.

Figure 14:
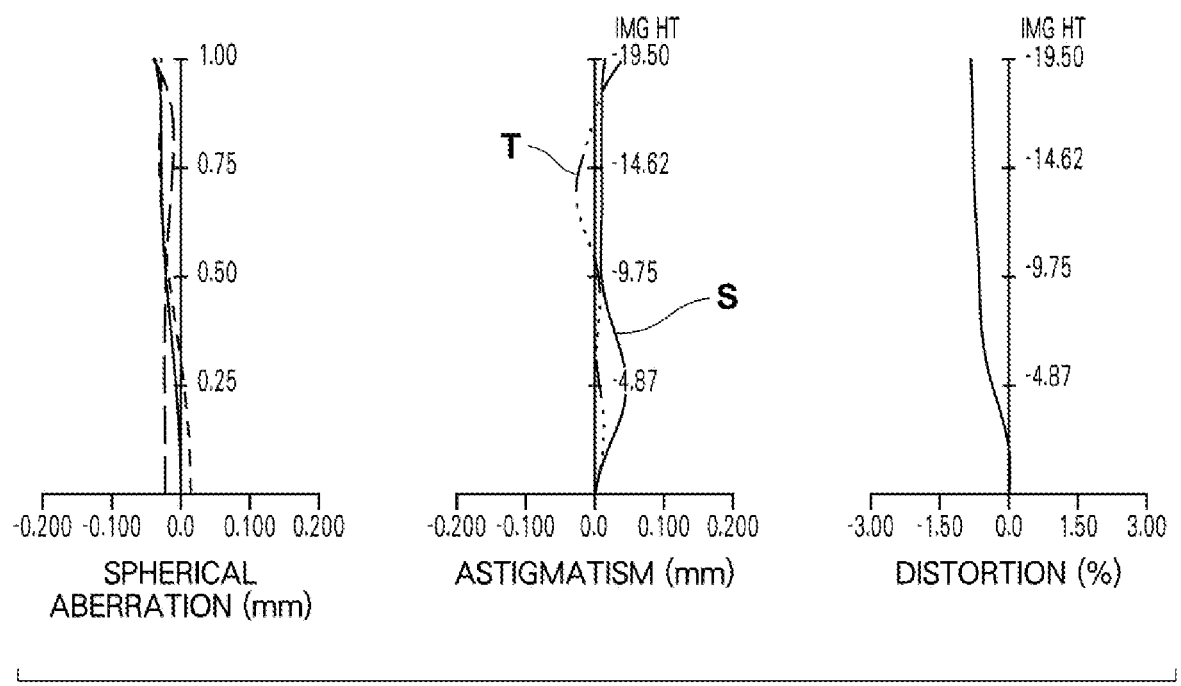
FIG. 14 A diagram showing a spherical aberration, an astigmatism and distortion in the projection optical system in Example 2

As shown in FIG. 13, coma aberrations are excellently corrected also in this Example 2. Further, as shown in FIG. 14, a spherical aberration, an astigmatism and distortion are also excellently corrected.

Next, the configuration of a projection optical system in Example 3 will be described. As illustrated in cross sections of FIG. 15 and FIG. 16, the projection optical system in Example 3 includes a first optical system 10 including first refractive system G1 and second refractive system G2 and a second optical system 20 including a reflective optical system in this order from the reduction side. The first refractive system G1 includes, for example, 18 lenses of lenses L1 through L18, and the second refractive system G2 includes, for example, 6 lenses of L19 through L24. In this Example 3, a first middle image 51 is formed in the first refractive system G1, and a second middle image 52 is formed between a prism 3 and a mirror 4. The second middle image 52 is reflected and magnified by the second optical system 20 including the mirror 4, and projected.

Here, field stop (flare cutter) St, aperture stop St and field stop St are arranged between lens L9 and lens L10 in this order from the reduction side toward the magnification side. Each illustrated stop St does not necessarily represent an exact size and shape, but represents a position on optical axis Z.

Figures 19, 20:
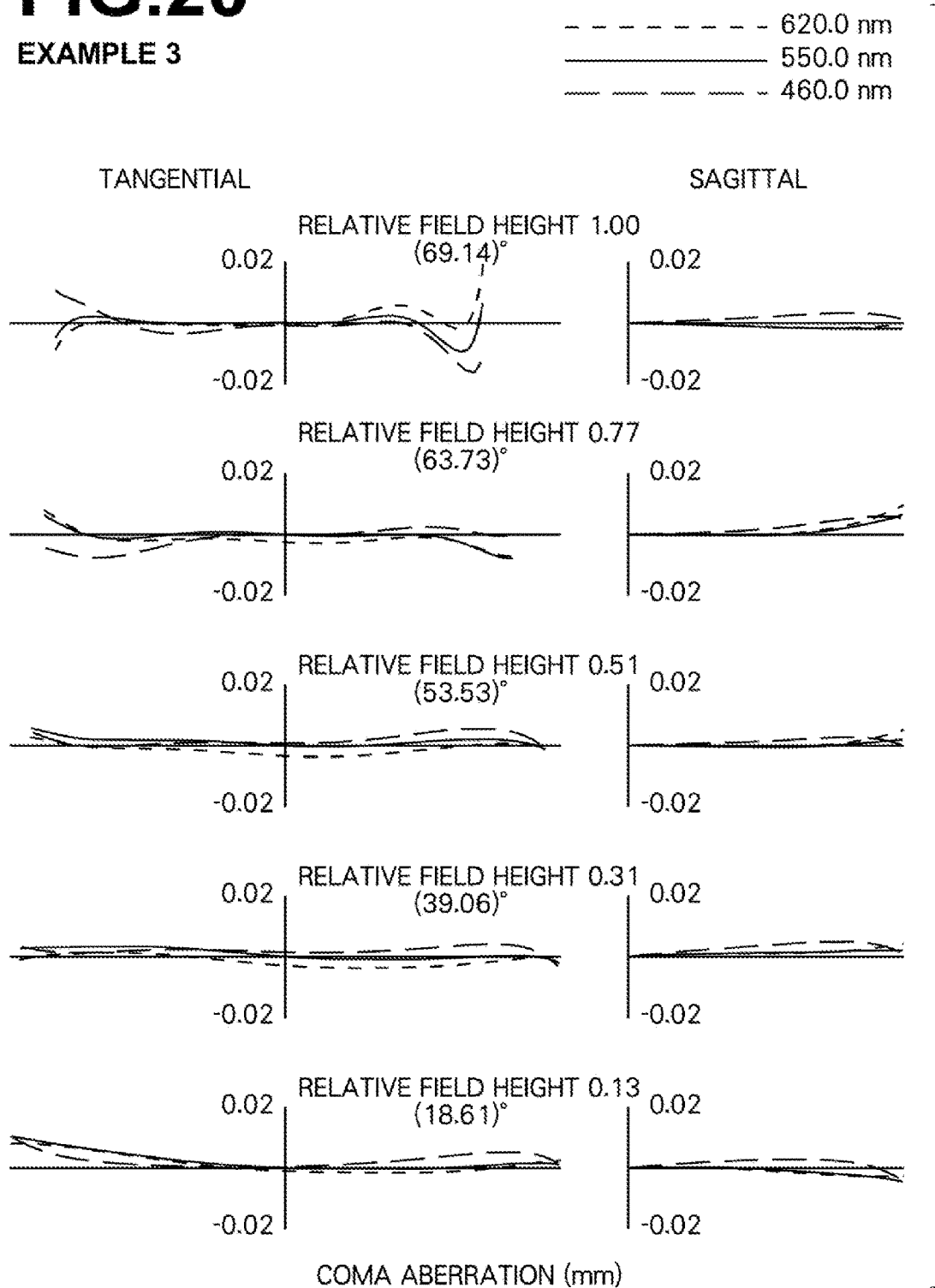
FIG. 19 A diagram showing a focal length of each part in the projection optical system in Example 3
FIG. 20 A diagram showing coma aberrations in the projection optical system in Example 3

Regarding the projection optical system in Example 3, FIG. 17 shows basic data of composition elements, and FIG. 18 shows data about aspheric surface coefficients, and FIG. 19 shows the focal length of each part.

In the basic data shown in FIG. 17, the column of "R/7.44" shows a value obtained by dividing the radius of curvature R by the focal length of the entire projection optical system (see FIG. 19). This focal length is represented by an absolute value in a similar manner to FIG. 3. In FIG. 17, "St" is written in a column of remarks for the surface number of a surface corresponding to each stop St.

In the basic data shown in FIG. 17, negative lenses satisfying the expression (1) are also all clearly indicated. In this Example 3, the negative lenses L3, L6, L8, L11, L13 and L18 satisfy the expression (1), and particularly, the negative lenses L3 and L6 satisfy also the expressions (2) and (3), and the negative lens L18 satisfies also the expression (2).

Further, in Example 3, the negative lenses L3, L6, L8, L13 and L18 satisfy the expression (1), and the positive lenses L2, L5, L7, L12 and L17 satisfy the expression (4). The refractive indices of the positive lenses L2, L5, L7, L12 and L17 are 1.75 or less.

Further, the negative lenses L3, L6, L8 and L18 satisfy the expression (2), and the positive lenses L2, L5, L7 and L17 satisfy the expression (6). The refractive indices of the lenses L2, L5, L7 and L17 are 1.70 or less.

Further, the negative lenses L3, L6 and L8 satisfy the expression (3), and the positive lenses L2, L5 and L7 satisfy the expression (7). The refractive indices of the positive lenses L2, L5 and L7 are 1.60 or less.

Further, in Example 3, negative first meniscus lens L18 and positive second meniscus lens L17 are arranged immediately on the reduction side of a position where the first middle image 51 is formed in this order from the first middle image 51 toward the reduction side with a convex surface of each of the meniscus lenses directed toward the first middle image 51 side in a similar manner to Example 2. An effect similar to that of Example 2 is achievable by this configuration.

Further, in Example 3, a combined focal length of the first meniscus lens L18 and the second meniscus lens L17 is −148.4 mm, and when the value is such a negative value, an effect similar to that of Example 2 is achievable.

Figure 21:
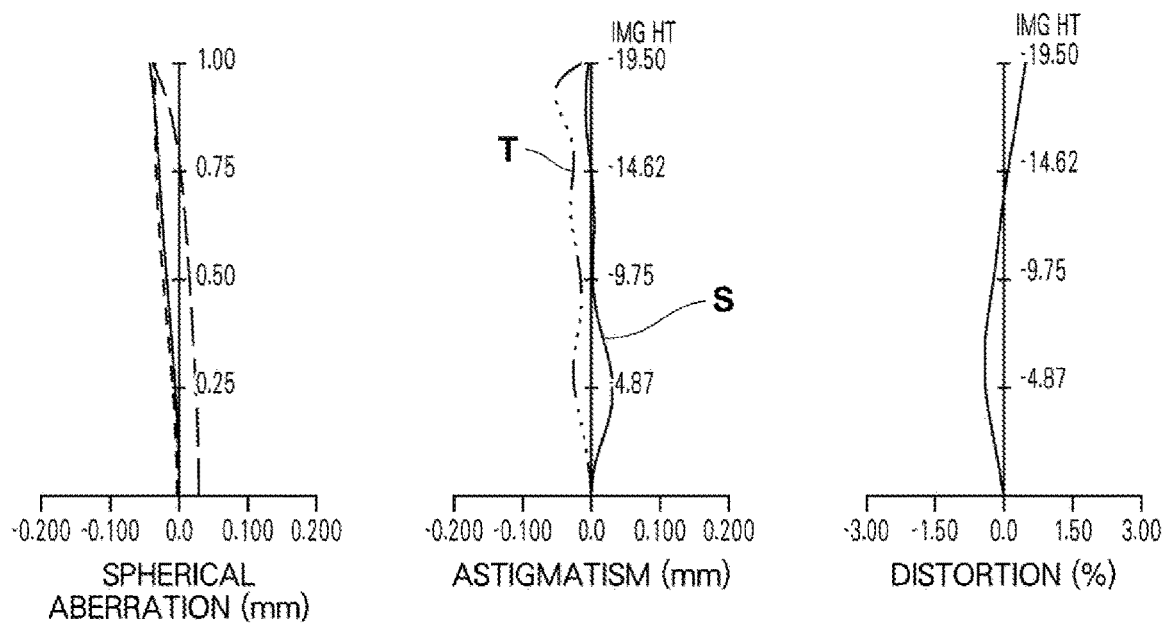
FIG. 21 A diagram showing a spherical aberration, an astigmatism and distortion in the projection optical system in Example 3.

As shown in FIG. 20, coma aberrations are excellently corrected also in this Example 3. Further, as shown in FIG. 21, a spherical aberration, an astigmatism and distortion are also excellently corrected.

So far, the present disclosure has been described by using embodiments and examples, but the projection optical system of the present disclosure is not limited to the aforementioned examples, and various modifications to the embodiments are possible. For example, the radius of curvature, surface distance, refractive index and Abbe's number of each lens may be appropriately modified.

Further, various modifications to the embodiments of the projector apparatus of the present disclosure are also possible, for example, in a light valve and an optical member used for separating or combining light fluxes.

EXPLANATION OF THE REFERENCE NUMERALS 1 an image display surface of a light modulator
2, 3 prisms
4 a mirror
10 a first optical system
20 a second optical system
51 a first middle image
52 a second middle image
G1 a first refractive system
G2 a second refractive system
L1 through L24 lenses

The invention claimed is:

1. A projection optical system for projecting an optical image from a first image plane on a reduction side onto a second image plane on a magnification side, the system comprising:
   an achromatic lens including a positive lens and a negative lens separately arranged in this order from the reduction side toward the magnification side, wherein the curvature of surfaces of the positive lens and the negative lens facing each other has a same polarity,
   wherein the negative lens having a refractive index of 1.7 or higher and an Abbe's number of 55 or less satisfies the following expression (1):

$$3.5 \leq |R|/|f| \quad (1),$$

where the radius of curvature of a light incident surface is R and the focal length of an entire projection optical system is f,
   wherein a first meniscus lens having negative refractive power and a second meniscus lens having positive refractive power are arranged immediately on the reduction side of the position of a middle image, formed in a refractive optical system by the refractive optical system including the achromatic lens, in this order from the middle image toward the reduction side with a convex surface of each of the meniscus lenses directed toward the middle image side, and wherein a third meniscus lens having positive refractive power is arranged immediately on the reduction side of the second meniscus lens.

2. The projection optical system according to claim 1, wherein the refractive index of the negative lens is 1.8 or higher, and the Abbe's number is 40 or less, and wherein the following expression (2) is satisfied:

$$4.5 \leq |R|/|f| \quad (2).$$

3. The projection optical system according to claim 1, wherein the refractive index of the negative lens is 1.85 or higher, and the Abbe's number is 35 or less, and wherein the following expression (3) is satisfied:

$$5.0 \leq |R|/|f| \quad (3).$$

4. The projection optical system according to claim 1, wherein the following expression (4) is satisfied:

$$3.5 \leq |R1|/|f| \quad (4),$$

where the radius of curvature of a light output side surface of the positive lens constituting the achromatic lens together with the negative lens satisfying the expression (1) is R1, and the focal length of the entire projection optical system is f.

5. The projection optical system according to claim 4, wherein the refractive index of the positive lens is 1.75 or less.

6. The projection optical system according to claim 1, wherein the refractive index and the Abbe's number of the second meniscus lens are substantially the same as those of the third meniscus lens, wherein the following expression (5) is satisfied:

$$|f1| < |f2| < |f3| \quad (5),$$

where the focal lengths of the first, second and third meniscus lenses are f1, f2 and f3, respectively.

7. A projector apparatus comprising:
a light source;
a light modulator for modulating light from the light source; and
the projection optical system according to claim 1, for projecting an optical image formed by the light modulated by the light modulator.

8. The projection optical system according to claim 2, wherein a first meniscus lens having negative refractive power and a second meniscus lens having positive refractive power are arranged immediately on the reduction side of the position of a middle image, formed in a refractive optical system by the refractive optical system including the achromatic lens, in this order from the middle image toward the reduction side with a convex surface of each of the meniscus lenses directed toward the middle image side.

9. The projection optical system according to claim 3, wherein a first meniscus lens having negative refractive power and a second meniscus lens having positive refractive power are arranged immediately on the reduction side of the position of a middle image, formed in a refractive optical system by the refractive optical system including the achromatic lens, in this order from the middle image toward the reduction side with a convex surface of each of the meniscus lenses directed toward the middle image side.

10. The projection optical system according to claim 4, wherein a first meniscus lens having negative refractive power and a second meniscus lens having positive refractive power are arranged immediately on the reduction side of the position of a middle image, formed in a refractive optical system by the refractive optical system including the achromatic lens, in this order from the middle image toward the reduction side with a convex surface of each of the meniscus lenses directed toward the middle image side.

11. A projector apparatus comprising:
a light source;
a light modulator for modulating light from the light source; and
the projection optical system, as defined in claim 2, for projecting an optical image formed by the light modulated by the light modulator.

12. A projection optical system for projecting an optical image from a first image plane on a reduction side onto a second image plane on a magnification side, the system comprising:

an achromatic lens including a positive lens and a negative lens separately arranged in this order from the reduction side toward the magnification side, wherein the curvature of surfaces of the positive lens and the negative lens facing each other has a same polarity, wherein a first meniscus lens having negative refractive power and a second meniscus lens having positive refractive power are arranged immediately on the reduction side of the position of a middle image, formed in a refractive optical system by the refractive optical system including the achromatic lens, in this order from the middle image toward the reduction side with a convex surface of each of the meniscus lenses directed toward the middle image side, wherein a third meniscus lens having positive refractive power is arranged immediately on the reduction side of the second meniscus lens, wherein the negative lens having a refractive index of 1.7 or higher and an Abbe's number of 55 or less satisfies the following expression (1):

$$3.5 \leq |R|/|f| \quad (1),$$

where the radius of curvature of a light incident surface is R and the focal length of an entire projection optical system is f, and wherein the refractive index of the negative lens is 1.8 or higher, and the Abbe's number is 40 or less, and wherein the following expression (2) is satisfied:

$$4.5 \leq |R|/|f| \quad (2).$$

13. A projection optical system for projecting an optical image from a first image plane on a reduction side onto a second image plane on a magnification side, the system comprising:

an achromatic lens including a positive lens and a negative lens separately arranged in this order from the reduction side toward the magnification side, wherein the curvature of surfaces of the positive lens and the negative lens facing each other has a same polarity, wherein a first meniscus lens having negative refractive power and a second meniscus lens having positive refractive power are arranged immediately on the reduction side of the position of a middle image, formed in a refractive optical system by the refractive optical system including the achromatic lens, in this order from the middle image toward the reduction side with a convex surface of each of the meniscus lenses directed toward the middle image side, wherein a third meniscus lens having positive refractive power is arranged immediately on the reduction side of the second meniscus lens, wherein the negative lens having a refractive index of 1.7 or higher and an Abbe's number of 55 or less satisfies the following expression (1):

$$3.5 \leq |R|/|f| \qquad (1),$$

where the radius of curvature of a light incident surface is R and the focal length of an entire projection optical system is f, and wherein the refractive index of the negative lens is 1.85 or higher, and the Abbe's number is 35 or less, and wherein the following expression (3) is satisfied:

$$5.0 \leq |R|/|f| \qquad (3).$$

14. A projection optical system for projecting an optical image from a first image plane on a reduction side onto a second image plane on a magnification side, the system comprising:

an achromatic lens including a positive lens and a negative lens separately arranged in this order from the reduction side toward the magnification side, wherein the curvature of surfaces of the positive lens and the negative lens facing each other has a same polarity, wherein a first meniscus lens having negative refractive power and a second meniscus lens having positive refractive power are arranged immediately on the reduction side of the position of a middle image, formed in a refractive optical system by the refractive optical system including the achromatic lens, in this order from the middle image toward the reduction side with a convex surface of each of the meniscus lenses directed toward the middle image side, wherein a third meniscus lens having positive refractive power is arranged immediately on the reduction side of the second meniscus lens, wherein the negative lens having a refractive index of 1.7 or higher and an Abbe's number of 55 or less satisfies the following expression (1):

$$3.5 \leq |R|/|f| \qquad (1),$$

where the radius of curvature of a light incident surface is R and the focal length of an entire projection optical system is f, and wherein the following expression (4) is satisfied:

$$3.5 \leq |R1|/|f| \qquad (4),$$

where the radius of curvature of a light output side surface of the positive lens constituting the achromatic lens together with the negative lens satisfying the expression (1) is R1, and the focal length of the entire projection optical system is f.

15. The projection optical system according to claim 13, wherein the refractive index and the Abbe's number of the second meniscus lens are substantially the same as those of the third meniscus lens, wherein the following expression (5) is satisfied:

$$|f1| < |f2| < |f3| \qquad (5),$$

where the focal lengths of the first, second and third meniscus lenses are f1, f2 and f3, respectively.

16. The projection optical system according to claim 14, wherein the refractive index and the Abbe's number of the second meniscus lens are substantially the same as those of the third meniscus lens, wherein the following expression (5) is satisfied:

$$|f1| < |f2| < |f3| \qquad (5),$$

where the focal lengths of the first, second and third meniscus lenses are f1, f2 and f3, respectively.

* * * * *